Jan. 15, 1952 L. J. FUNKE 2,582,692
SANDWICH GRILL
Filed Oct. 23, 1950 2 SHEETS—SHEET 1

INVENTOR.
Lawrence J. Funke
BY
Wood, Arey, Henson & Evans
ATTORNEYS

Jan. 15, 1952  L. J. FUNKE  2,582,692
SANDWICH GRILL
Filed Oct. 23, 1950  2 SHEETS—SHEET 2
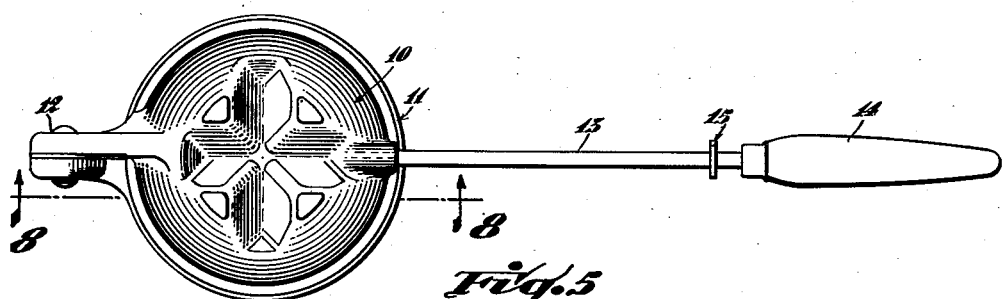
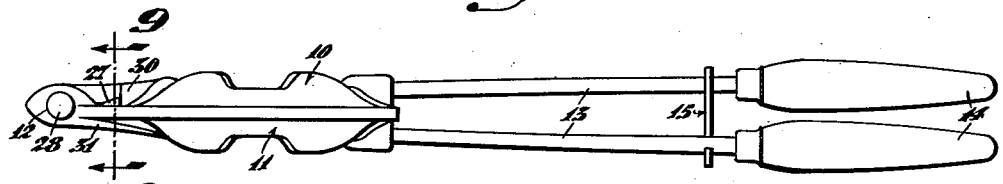
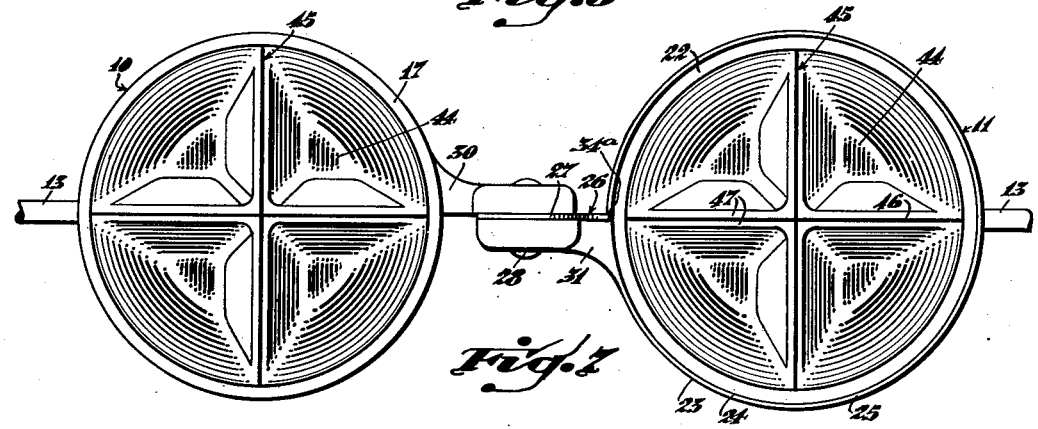
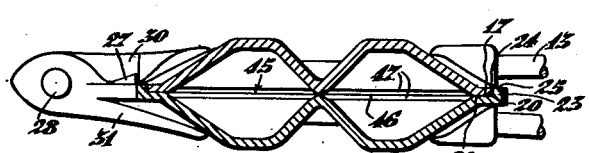
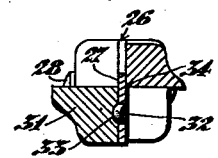
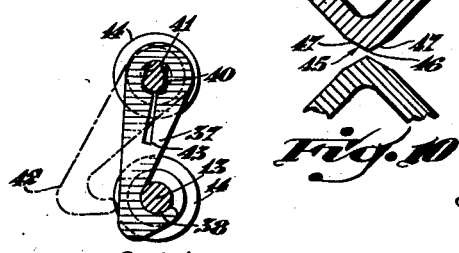
INVENTOR
Lawrence J. Funke
BY
Wood, Arey, Henson & Evans
ATTORNEYS Patented Jan. 15, 1952

2,582,692

UNITED STATES PATENT OFFICE 2,582,692

SANDWICH GRILL

Lawrence J. Funke, Cincinnati, Ohio, assignor to Bar-B-Buns, Incorporated, Cincinnati, Ohio, a corporation of Ohio Application October 23, 1950, Serial No. 191,585

3 Claims. (Cl. 99—372)

This invention relates to grills of the type designed to form a toasted, sealed-in sandwich from two slices of bread and filling material. Generally, these grills comprise a pair of hinged mold plates which are adapted to be clamped together in mating relationship with the two slices of bread and filling material disposed between them. The central portions of the faces of the mold plates are concave, whereas the annular areas at the margins of the faces are comparatively shallow and designed to squeeze together the edges of the two slices of bread so that when the molds are heated, the combination of the clamping pressure and heat forms an envelope of toasted bread enclosing the filling material and sealing it in.

The present invention is directed to improvements in grills of the type described and particularly to certain structural improvements which increase greatly the efficiency of their operation.

It has been suggested in the past, for grills of this type, that the marginal rims of the two mold plates be designed so that upon mating together, the crust edges of the two slices of bread are sheared away. Ideally, the mating should be precise so that the shear is clean and the crust edges fall away from the plates of their own weight. From a cost standpoint, however, it is impractical to machine the mold plates in order to provide such a precise fit; and, as a matter of fact, prior mold plates were of such construction that without machining they could not be made, by simple casting operations, to fit together with the degree of precision required in order to obtain clean separation.

The objective, then, as seen by the present inventor, has been to provide mold plates of such construction and design that they function precisely even though made by less than precise methods. In keeping with this objective, the mold plates of the improved grill are constructed so that it is possible to obtain a more nearly perfect fit between mating pairs even though the two plates are made by ordinary casting methods, thus providing better shearing. But, in addition, and in order to insure that the bread crust portions separate sompletely, the mold plates are designed so that they cooperate, after effecting the shear, to push the sheared crust portions away from the edges of the sandwich bread retained, the latter action breaking the few remaining attaching shreds of bread in order that the crust portions be free to fall away from the grill.

A rather annoying characteristic of prior grills of this general type is that the hinge structures employed were such that when the mold plates closed upon two slices of bread, portions of the crust edge were caught between the two parts of the hinge and unless removed by a knife or other instrument, burned during the toasting of the sandwich. Thus, in keeping with the objective to provide complete separation of the crust edges, the present grill incorporates a novel shearing element within the hinge, so that bread is not caught at this point. This particular feature, plus the clean shearing obtained around the edges of the molds, makes it possible, by simply closing the plates, to have all crust portions of the bread fall away from the molds, leaving only the circular centers of the slices of bread within the grill.

The sealing action of grills of this type, is obtained through a combination of heat and pressure. The marginal edges of the slices of bread within the mold fuse when squeezed together and heated, so that the finished sandwich is in the form of an envelope, enclosing the filling material. Usually, in the hand models, at least, the grill is held over an open flame in order to toast the sandwich, and thus the amount of heat is simply a function of time. Pressure, however, can be varied, and in the present grill, the construction is such that the pressure imparted to the marginal edges of the bread is substantially greater than in prior grill devices so that, in effect, the heating time required in order to effect sealing is lessened. It has been found that prolonged heating results in a rather hard, inedible sandwich edge and thus by increasing pressure, less heat is needed for sealing; with the result that the edges of toasted sandwiches made in the present grill are much more palatable than those made in prior grills. In order to obtain the increased pressure, the handles have been arranged so that it is required that the outer ends, or hand grip portions of the handles, be sprung toward each other to final clamping position, the force required in moving into the final clamping position pressing the two mold plates toward each other under considerable sealing pressure.

An additional feature of the present grill construction is a novel latch which is provided for holding the two molds in final clamped position. It has been an objective of the inventor to provide a latch which is quite economical to manufacture and which is simple to operate. In the preferred embodiment, the latch is such that it may be swung into or out of latching position by merely turning the unit slightly, it being unnecessary to touch the latch in either instance.

In a modified form of the improved grill, the mold plates are divided into sectors. An important feature of this modification is that the toasted sandwich may be broken apart very easily into small sections which are themselves sealed marginally in the manner of sandwiches made in the preferred embodiment of the invention. Other features of this modification and advantages of the improved grill will be discussed in greater detail in the following description of the drawings in which:

Figure 5 is a top plan view of the modified form of the present grill in which the mold plates are divided into sectors.

Figure 6 is a side elevational view of the grill shown in Figure 5.

Figure 7 is a plan view showing the inner faces of the mold plates of the grill of Figure 5.

Figure 8 is a cross-sectional view taken on the line 8—8 in Figure 5.

Figure 9 is a fragmentary cross-sectional view taken on the line 9—9 of Figure 6.

Figure 10 is an enlarged fragmentary view of the central portion of Figure 8.

Figure 11 is a cross-sectional view taken on the line 11—11 in Figure 2 illustrating the preferred latching means of the grill handles.

Figure 1:
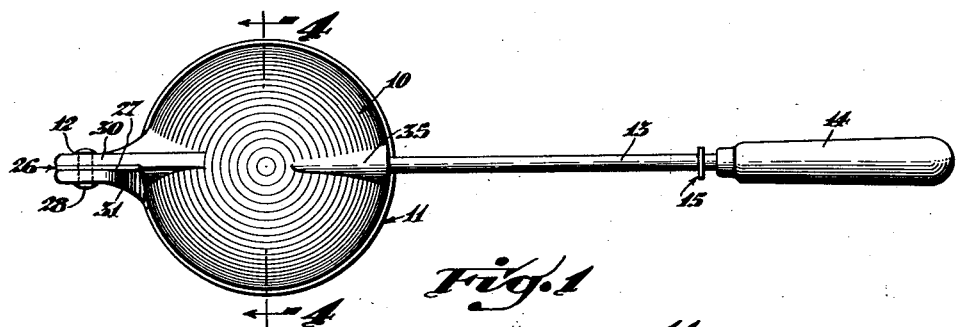
Figure 1 is a top plan view of the improved grill.

Referring to Figure 1, the grill comprises, generally, a pair of mold plates 10 and 11 which are hinged together as at 12. The mold plate 10 comprises the male die of the two and the plate 11, the female die. Opposite the hinge structure 12, handles 13 are provided for the mold plates, the handles terminating in hand grips 14. Just inwardly of the grips 14, a latch mechanism indicated generally at 15 is disposed.

Figure 4:
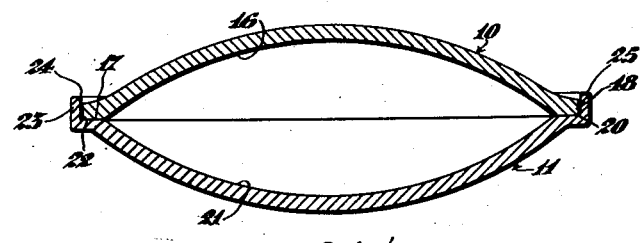
Figure 4 is a cross-sectional view taken on the line 4—4 of Figure 1.

Referring now to Figure 4, the male die 10 is concave at its inner face 16, the concavity of face 16 terminating in a flat annular ring 17 which is at the margin of the die. The periphery 18 of mold 10 is at right angles to the annular ring 17 so that a rather sharp edge 20 is provided between the two. It will be noted that in cross section mold plate 10 is comparatively thick so that an even distribution of heat is attained. In order to augment the distribution of heat, it is preferred that both plates be made of aluminum or some other inexpensive material having a high coefficient of heat transfer. It has been found that the configuration shown for mold plate 10 can be obtained by ordinary casting methods without the necessity of machining or other tooling operations in order to provide a rather sharp edge at 20.

The other mold plate 11 is substantially the same shape as die 10 having a concave face 21 which is the counterpart of face 16. Around the concave portion of mold plate 11 a flat annular ring 22 is provided, the ring 22 matching ring 17 of plate 10. Outwardly of ring 22, plate 11 is provided with a right angular peripheral flange 23 which is designed to embrace the periphery 18 of plate 10 when the two are in the closed position shown in Figure 4. Preferably, the inner edge 24 of flange 23 is fairly sharp so that it cooperates with edge 20 when the dies are being moved into closed position to shear off the crust portions of the bread. As with edge 20, edge 24 can be formed by conventional molding operations. It will be noted that flange 23 is substantially higher than the marginal edge of plate 10 so that when in the closed position periphery 18 of the male die is enclosed by the flange. Thus, the sheared edges of bread between the plates is protected from the open flame when the grill is being heated.

The height of flange 23 in comparison with periphery 18 results in a complete separation of edge 20 from edge 24 when the two dies are closed and squeezed together upon two slices of bread. Thus, the sheared crust edges of bread are pushed away from edge 20 resulting in a complete separation around the two dies. The pushing action is the result of the telescoping of mold plate 10 within mold plate 11 and in order to make a clean break, it is not necessary that the upper edge 25 of flange 23 be a sharp cutting edge. In fact, it has been found that a relatively flat edge 25 (as shown) provides better shearing than does a sharpened edge.

At the hinged side of the respective mold plates, a shearing element, which is indicated generally at 26, is provided in order that the bread crusts are not caught within the hinge when the plates are closed. The element is designed to cut the crusts in two at this point so that with these portions separated completely around the two molds and cut through at this side, they are completely free to fall away from the mold plates. Specifically, the shear element includes a blade 27, mounted on hinge pin 28, between the two hinge arms 30 and 31 which are formed as part of the castings of the respective mold plates. The hinge arm 30 of plate 10 extends outwardly from the front of the plate and has a flat lower edge which is in line with the flange edge 25 on plate 11, and the hinge arm 31 extends forwardly from mold plate 11 and has a flat upper surface also in line with edge 25 so that the respective upper and lower surfaces of the two hinge arms are substantially in the same plane, this plane also passing through hinge pin 28. At the outer ends of both arms, bosses are formed to accommodate and journal hinge pin 28. Pin 28 may be swaged over at the respective ends to secure it in place. Blade 27 is disposed between the two arms and preferably is fastened to the lower one of the two by a tang, such as the one indicated at 32, which may be formed by a simple stamping operation in which the tank is pushed outwardly to the side of the blade to reside within a depression 33 formed within the side face of hinge arm 31. The tank 32 thus cooperates with the pin 28 to maintain the blade against movement relative to arm 31, and it will be noted that the inner faces of both arms are straight and that blade 27 passes the edge indicated at 34 on arm 31 in a shearing relationship when the two arms are swung together to close the grill.

It will be noted that the two arms are substantially identical and are offset with respect to a line through the center of the grill so that when the two plates are pinned together, with the blade between them, the blade is bisected by such a center line. The blade itself is configurated generally to conform to the shapes of the outer ends of respective arms, however, between the hinge pin and the marginal edges of the mold plates, the blade is slanted upwardly toward the inner end 34a which overhangs the upper edge 25 of flange 23. The slanted portion of the blade provides progressive shearing action from the end 34a outwardly and thus, the blade separates the crust edges of the bread right up to the point where they are sheared by the mold plates, completing the separation.

Figure 2:
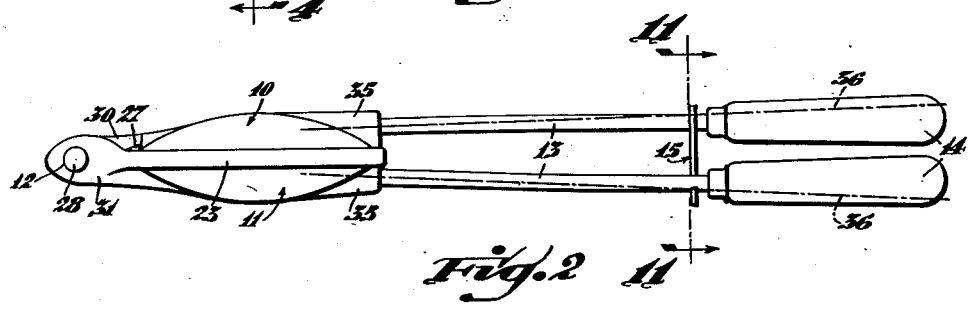
Figure 2 is a side elevational view thereof.
Figure 3:
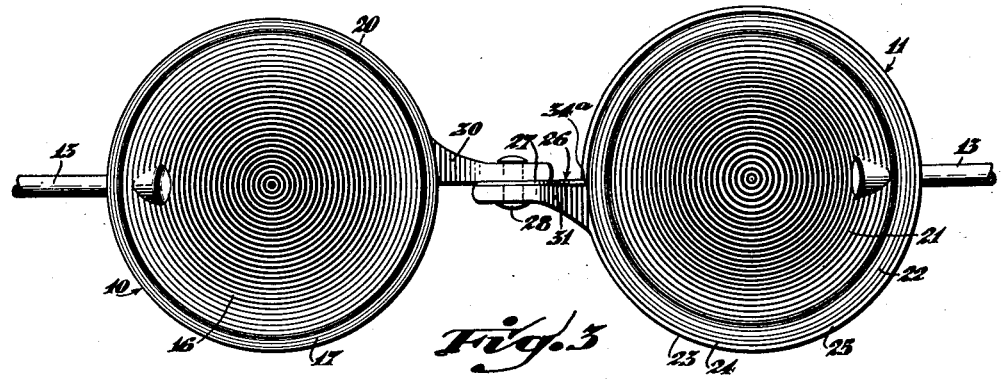
Figure 3 is a plan view of the inner faces of the respective mold plates with the grill shown in open position.

The handles 13—13 are mounted in the respective mold plates at points diametrically opposite the hinge 12. In each instance, projections 35 are provided on each of the mold plates to receive the inner ends of the handles. Preferably, these projections are cast in one piece with the mold plates. Threaded connections may be used, if desired, for the inner ends of the respective handles; however, it is suggested that the projections be bored out to receive the handles in press-fit relationship. It will be noted from the dot-dash lines 36 of Figure 2 of the drawings that the axes of the respective bores in the two projections are not parallel, but diverge. Thus, when the handles are fitted within the bores, the hand-grip ends 14 are spaced apart in the manner shown by the dot-dash lines 36. Thus, when the two handles are brought together and latched, as shown in this figure, springiness of the handles clamps the two mold plates together with substantial pressure. The amount that the two handles are bent need not be great. However, if fairly stiff rod material is utilized in their construction, substantial pressure can be obtained with comparatively little bending.

In order to maintain the two handles in closed, pressure-exerting position, latch 15 is provided. This latch is shown in detail in Figure 11. The latch itself is formed from sheet metal by stamping out a hook-shaped element such as that shown at 37, having one end formed into a foot 38. Foot 38 is curved and adapted to engage under the lower of the two handles 13—13. It will be noted that there is a slight clearance between the two hand grips even after the handles are latched together, this clearance making it possible to squeeze the two hand grips together in order to free the foot from under the lower handle.

In the upper end of the latch element, a rectangular slot such as that shown at 40 is formed. Slot 40 is engaged about the upper of the two handles at a point where parallel grooves 41 are cut into the two sides of the handle. The handle material retained between the two grooves 41 is substantially rectangular in cross section and just slightly less in width than the rectangular opening 40 within hooked member 37. This arrangement makes it possible for the hooked member to swing in a slight arc, at least sufficient to clear the curved foot 38 from under the lower handle as shown by the dot-dash lines 42 in Figure 11. Preferably, the hooked element is formed initially with the rectangular slot 40 of such width that the member can be slid over the end of the upper handle, before the handle is attached, to the grooves 41 and then compressed at the two sides opposite the rectangular slot 40 so that the slot is decreased in size to a width less than the diameter of handle 13 and just slightly greater than the cross section of the material between grooves 41. In order to make such a forming operation feasible, an elongated slit 43 is provided centrally of hooked member 37 which opens into slot 40. It is preferred that rectangular slot 40 be engaged within grooves 41 rather loosely so that the hooked member is free to swing away from the lower handle when the two handles as a unit are turned slightly from a position in which one is above the other to a position in which the upper is to the left of the lower (as seen in Figure 11).

In the modified form of the improved grill shown in Figures 5-10, the handle construction, shear-type hinge and latching mechanism described above are utilized. The modification differs from the preferred embodiment only in that the mold plates are divided into sections. The purpose of this particular construction is to divide the sandwich into a number of small, individually sealed sections which may be separated readily after toasting. The result is a new and entirely different food product which makes exceptionally tasty hors d'oeuvres when broken into the small sections. The fact that each small section is sealed makes it an ideal tid-bit to serve with cocktails and the like.

In making a sandwich with this grill, a slice of bread is placed upon one of the mold plates and small piles of filling material grouped on it according to the disposition of the sections in the mold plates. The second slice of bread is then placed on top of the filling material and the two plates closed together. The shearing action provided by closing the two mold plates is the same as described above. However, in this instance, the two mold plates are configurated so that the sections formed in the sandwich are sealed one from the other, in addition to the marginal sealing of the whole sandwich.

In the device shown, each mold plate is divided into four sections; however, it will be obvious that the number may be varied. In the mold plates, the marginal angular rims 17 and 22 which cooperate to effect the edgewise seal around the sandwich may be identical with those of the preferred form of the invention described above, the central cavity portions only being modified. The inner faces of the cavities are indicated by the numeral 44 and are separated one from the other by ridges indicated generally at 45. Referring to Figure 10, each ridge is V-shaped and terminates in a somewhat blunted edge 46 which, in the preferred embodiment, is in the plane of the flat marginal sealing rims 17 and 22, respectively. This particular arrangement of the edges 46 with respect to the rims may be varied by recessing the edges slightly, however. At each side of the edge of the ridge, an angulated flat 47 is provided, these flats being set at a lesser angle than the side walls of the cavities. The flats 47 cooperate to seal the edges of the respective sections of the sandwich while the edges 46 cooperate to form lines of weakening in the bread which define the small sandwich sections. When the bread is toasted, those portions engaged by the edges 47 are quite thin and rather crisp, so that the individual sections may be separated readily without breaking their sealed edges. As in the preferred embodiment, this particular configuration for the mold plates may be obtained by casting methods so that machining, in order to provide a nice fit between the respective edges 46, is unnecessary.

Having described my invention, I claim:

1. A device for making a sealed toasted sandwich from two slices of bread and filling material, said device comprising, a pair of complementary mold plates, hinge means connecting the mold plates to permit swinging movement of the plates toward and away from closed facial engagement with one another, each of said plates configurated to provide a relatively deep sandwich-shaping facial cavity and a flat annular rim surrounding the cavity, one of said mold plates having a peripheral flange extending facially outwardly from the outer margin of its rim adapted to receive the rim of the second mold plate in snug telescoping relationship when the two plates are swung into facial engagement with each other, whereby the flange of the one plate cooperates with the rim of the other plate to effect separation of the crust edges of the slices of bread from the bread enclosed within the mold plates, and a shearing element associated with the hinge means adapted to cut through the crust edges of the two slices of bread at the hinge means.

2. In a grill of the type having a pair of hinged mold plates adapted to be swung together and closed upon two slices of bread having filling material between them and shear away the crust edges of the bread, hinge means comprising, a hinge arm extending outwardly from each of the mold plates, a hinge pin pivotally joining the outer ends of said arms, and a shear blade secured to one of said arms and adapted to cooperate with the other of the arms to shear the crust edges of the bread between the respective hinge arms.

3. In a grill of the type having a pair of hinged mold plates adapted to be swung together and closed upon two slices of bread having filling material between them and shear away the crust edges of the bread around the closed plates, hinge means comprising, an arm extending outwardly from each of the mold plates, a shear blade, the respective arms being offset to the side with respect to one another to accommodate the shear blade between them, said blade being fixed relative to one of said arms and adapted to cooperate with the other of the arms to shear the crust edges of the bread between the respective arms.

LAWRENCE J. FUNKE.

REFERENCES CITED

The following references are of record in the file of this patent:

UNITED STATES PATENTS

| Number | Name | Date |
| --- | --- | --- |
| 736,155 | Rifkin et al. | Aug. 11, 1903 |
| 1,336,734 | De Graff | Apr. 13, 1920 |
| 1,606,778 | Yancey | Nov. 16, 1926 |
| 1,742,945 | Banff | Jan. 7, 1930 |
| 1,777,723 | Hammi | Oct. 7, 1930 |
| 1,969,361 | Fajen | Aug. 7, 1934 |
| 2,005,010 | Smith | June 18, 1935 |
| 2,463,439 | Strietelmeier | Mar. 1, 1949 |

FOREIGN PATENTS

| Number | Country | Date |
| --- | --- | --- |
| 27,178 | Great Britain | A. D. 1911 |